UNITED STATES PATENT OFFICE.

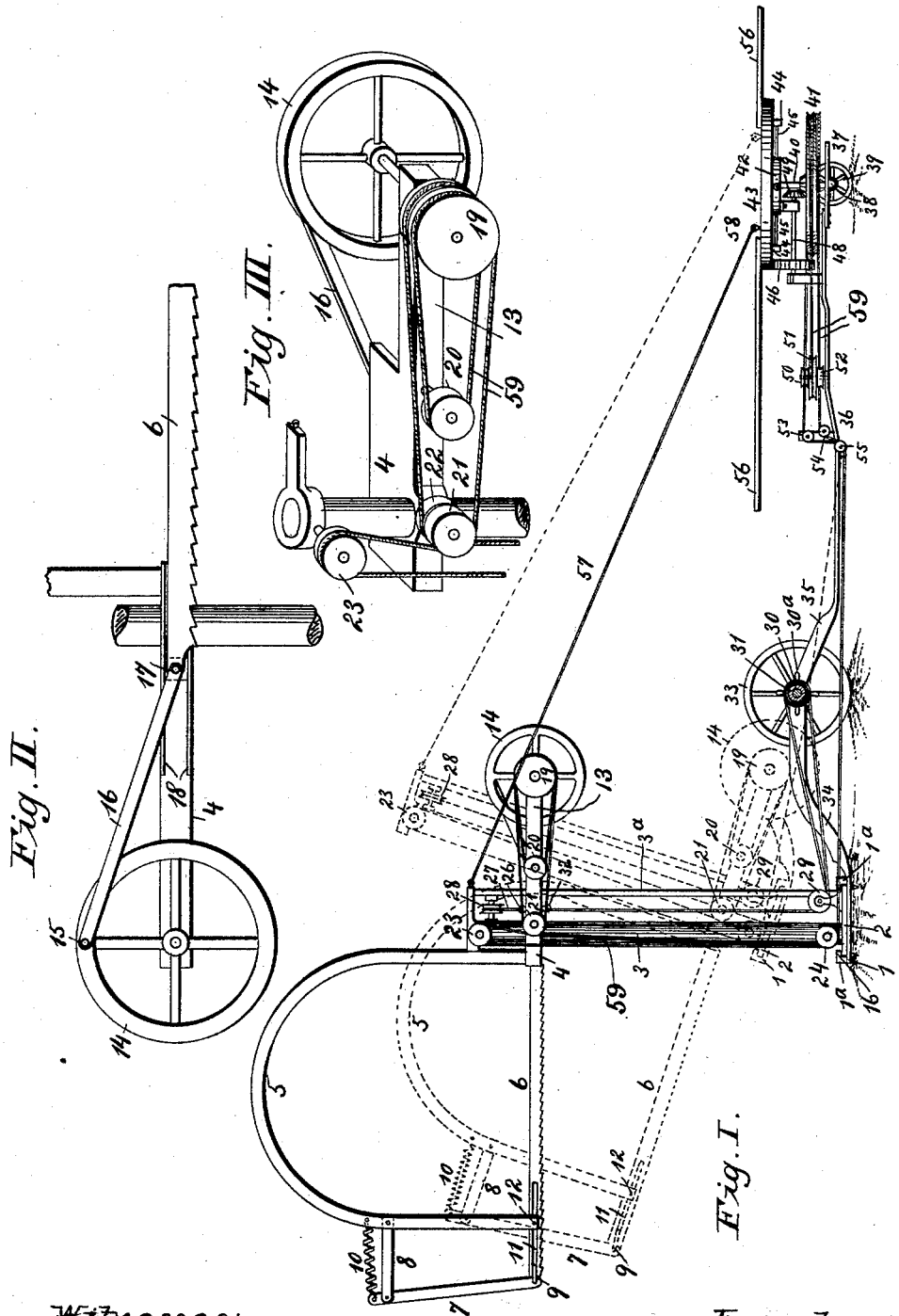

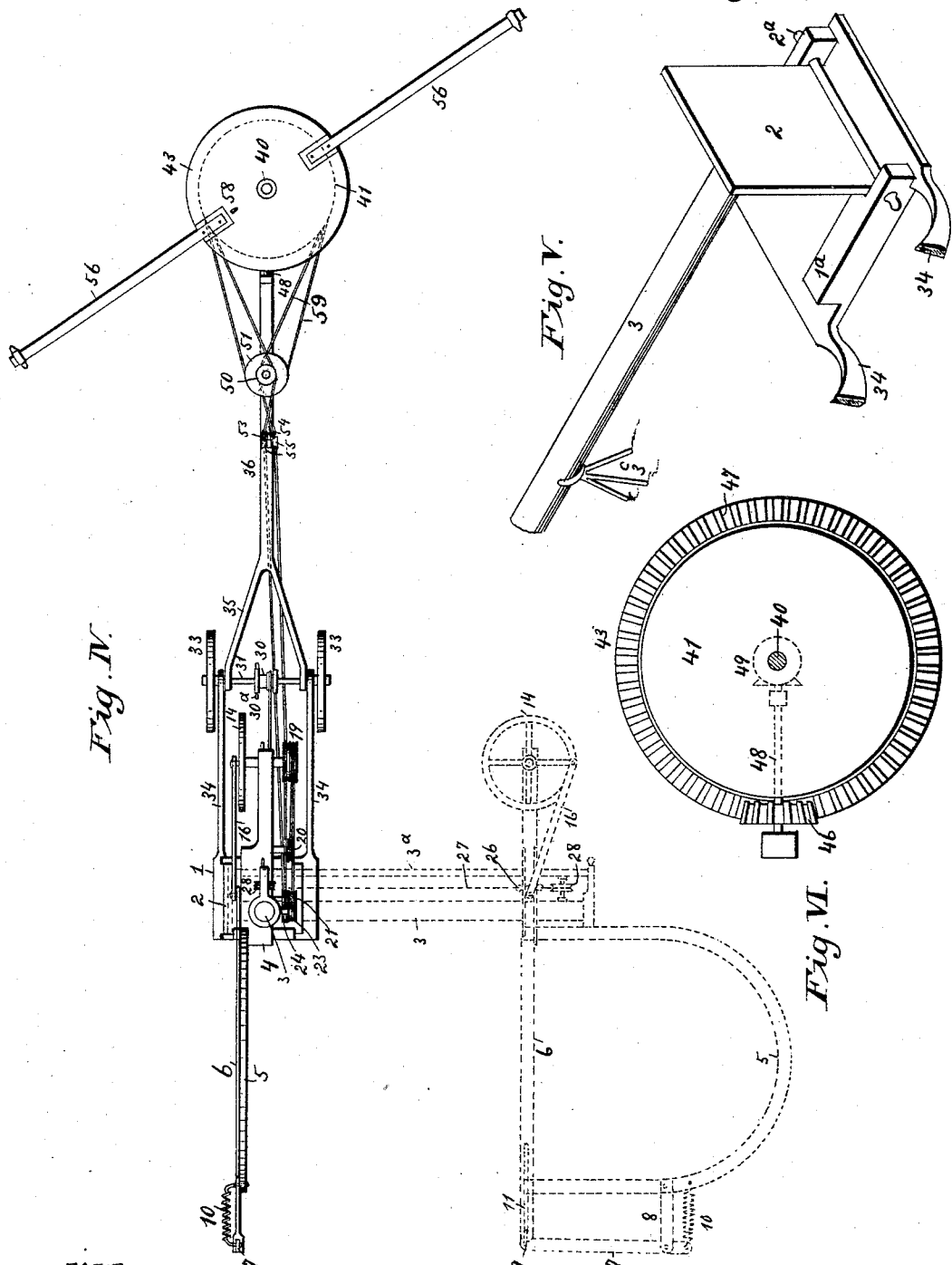

JOHN ANDREW MORRELL, OF KANSAS CITY, MISSOURI.

PORTABLE SAWING-MACHINE.

SPECIFICATION forming part of Letters Patent No. 524,644, dated August 14, 1894.

Application filed November 27, 1893. Serial No. 492,135. (No model.)

*To all whom it may concern:*

Be it known that I, JOHN ANDREW MORRELL, of Kansas City, in the county of Jackson and State of Missouri, have invented certain new and useful Improvements in Portable Sawing-Machines, of which the following is a full, clear, and exact description, reference being had to the drawings hereunto annexed and made part of this specification.

My invention relates to saw mills which are operated by horse or other power and intended for use in sawing down trees and their bodies into lengths; and the objects of my improvements are to provide a sawing mill easily portable which can be brought into position by the side of the tree or log for operation and there securely stationed; to provide a frame carrying the saw adjustable to a horizontal position for the purpose of sawing down trees; to provide a frame carrying the saw adjustable upon its supporting posts; to provide means of operating the saw accommodated to its adjustment on the post supporting the saw frame. I obtain these objects by means of the mechanism illustrated in the accompanying drawings, in which—

Figure I is a vertical projection of my machine. Fig. II is a detailed view of the saw and wheels operating the saw. Fig. III is a detailed view of the cable operating the saw and pulleys upon which it runs. Fig. IV is a horizontal projection of the machine, the dotted lines in said figure showing the horizontal position of the saw and its frame for use in sawing down trees. Fig. V shows position of the bars and post of saw frame and tripod supporting saw when saw is used in horizontal position. Fig. VI shows the under side of drive wheel of horse power and pinions operated thereby.

Similar numerals refer to similar parts throughout the several views.

1 is the ground plate on which rests the base plate 2 supporting the posts 3; $3^a$ carrying the frame 4 of the saw. The frame 4 is constructed with the arch 5, between the arms of which the saw operates. Beyond the outside arm of the arch is the lever 7 pivoted on the arm 8 secured at its lower end by the link 9 to the saw and connected at its upper end by the coiled spring 10 to the arch. The link 9 is secured in the slot 11 in the saw, in which also operates the pin 12 which serves as a guide to the outer end of the saw. Upon the extension 13 of the saw frame is the wheel 14. Upon the wrist pin 15 of wheel is carried the pitman 16, connected with the saw at 17.

18 are grooves or slides in the frame 13 in which the saw works. Upon the extended shaft of the wheel 14 are the grooved pulleys 19.

20 is a grooved pulley set on the frame 13.

21, 22, 23, and 24 are grooved pulleys on the saw frame, the purpose of which will be hereinafter explained.

26 is an eye set in the upper side of the saw frame 13, in which is attached the cable 27 passing over the pulley 28 and down and under the pulley 29 and over the pulley 30 set on the axle 31, thence passing back under pulley 29 is secured to the eye 32 on the under side of the frame 13. Upon the axle 31 are the wheels 33 of the carriage; also pivoted on this axle are the arms 34 connected with the ground plate 1.

The ground plate 1 is provided with the side bars $1^a$, having extensions $1^b$ under which the base plate 2 operates.

$2^a$ is a pin for holding base plate in position when the frame is placed horizontally.

The axle 31 carries also the arms 35 which connecting, form the coupling pole 36 which is connected with the frame 37 resting on the axle 38 of the front carriage 39.

40 is a post resting on frame 39 carrying the sleeve (not shown) which bears the double grooved pulley 41.

42 is a head resting on the sleeve carried on the post 40.

43 is a drive wheel of the horse power resting upon the head.

44 are rollers supported on arms 45 for retaining the drive wheel in position.

46 is a pinion working in the cogs 47 of the drive wheel and through the shaft 48 operating the bevel pinion 49 by which motion is given to the grooved pulley 41.

50, 51, 52, 53, 54 and 55 are loose pulleys the use of which will be hereinafter noted.

56 are levers connected with the drive wheel 43.

57 is a rod or chain connecting the top of the saw frame with the eye 58 near the circumference of the drive wheel.

The pulley 30 is provided upon its extension with the handles 30ª for operating the saw.

The operation of my improved machine is in this wise: The saw frame is suspended on the axle 31 by the draft on the rod 57 as shown in the dotted lines in Fig. I. In this position, the machine is brought against the log to be sawed and the frame lowered until the ground plate 1 comes upon the ground and is secured thereto by pins or posts driven therein. The saw is adjusted to the log by means of the cable 27 operated by the pulley 30, being raised or lowered on the post thereby. Motion is given the saw by the cable 59 which passes twice around the double grooved pulley 41 of the power, passing over the pulley 53, under the pulley 55, under the pulley 24, over the pulley 23, under the pulley 21, over the outer pulley at 19, over the pulley at 20, over the inner pulley at 19, thus conveying the motion from the power to the saw. It thence passes back over the pulley 21 and also under a loose pulley on the same pulley shaft with 24, under 55, over 54 and under 52 back to the drive pulley 41. As the saw passes through the log, it is kept in contact with the timber by means of the cord 27, actuated by the handles 30ª. The purpose of the spring 10 acting through the lever 7 upon the saw, is to assist in drawing it through the log and also to keep it straight and prevent bending of the saw. When the log is sawed off, the saw is elevated by the cable 27 and by attaching the rod 57 to the top of the saw frame and securing it at the eye 58 in the position shown in Fig. I, and carrying the power one-half turn, bringing it to the position shown by the dotted lines. The saw frame is drawn up and suspended on the axle 31 and is ready to be moved to another position.

When it is desired to saw down a tree with my improved saw, the base plate 2 is moved upon the ground plate until free from the extensions of the side bars 1ª, and the frame is then placed in a horizontal position, being supported by the tripod 3ᶜ under the post 3, and is retained by the pin 2ª through the side bars 1ª, and is operated by the cables in the same manner as when in a vertical position. To the axle of the front carriage 39 may be attached a tongue for attaching horses by which the machine may be drawn from place to place. I do not limit myself, however, to the use of the horse power attachments, but may drive the mechanism by an engine by passing a cable, or preferably a sprocket chain, over the drive wheel of the engine, replacing the grooved pulleys on the saw frame with sprocket pulleys.

Having thus fully described my improvements, what I claim as my invention, and desire to secure by Letters Patent, is—

1. In a sawing machine, a frame having one end of its ground plate supported by wheels and axle, the other end carrying posts supporting a saw frame adjustable upon said frame and a cable and pulleys to accomplish said adjustment; substantially as shown and described for the purpose specified.

2. In a sawing machine, a ground plate having its front end supported by wheel and axle and base plate working thereon, posts secured to base plate, and saw frame adjustably supported on the posts, a saw working in the frame, and supported thereby, means of operating this saw and means for adjusting the saw frame on the posts; substantially as shown and described for the purpose specified.

3. In a sawing machine, a ground plate provided with an arm supported by wheels and axle, a base plate on said ground plate, side bars on said ground plate provided with extensions in which said base plate works, posts on the base plate, and saw frame adjustable on said posts, an arch on saw frame, the outer arm of arch supporting the outer end of the saw, a lever having one end secured to the outer end of the saw, a coil spring connecting the other end of the lever with the arm of the arch, a wheel on an extension of the saw frame carrying a pitman operating saw, pulleys loosely pivoted on the saw frame, a cable passing around said pulleys for operating the saw, and a cable secured to eyes passing over pulleys on shafts secured to the posts for adjusting the saw frame; substantially as shown and described for the purpose specified.

4. In a sawing machine, a ground plate provided with flanges and base plate working in said flanges, posts supported on said base plate and saw frame carried on said posts, a tripod for supporting posts and frame when in a horizontal position, and a pin for securing the base plate passing through the sides of a ground plate; substantially as shown and described for the purpose specified.

5. In a sawing machine, a frame supporting the saw, one end of the ground sill of the frame resting on the ground, the other end carried on an axle and wheels, and horse power for driving the saw, and a cable connecting the upper end of the saw frame with the drive wheel of the horse power near its circumference so that by a half turn of the drive wheel, the saw frame is raised and supported on its axle; substantially as shown and described for the purpose specified.

JOHN ANDREW MORRELL.

Witnesses:
T. S. BROWN,
R. L. SILVERMAN.